United States Patent Office 3,034,986
Patented May 15, 1962

3,034,986
FERRITE MATERIALS
Donald Heston Baird and Joseph John Dymon, Flushing, N.Y., assignors, by mesne assignments, to Sylvania Electric Products Inc., Wilmington, Del., a corporation of Delaware
No Drawing. Filed Jan. 3, 1956, Ser. No. 557,429
2 Claims. (Cl. 252—62.5)

Our invention is directed toward ferrite materials and more particularly relates to ferrite materials which find application at microwave frequencies.

It is known that when an electromagnetic wave propagated at microwave frequencies is supplied to a circuit element formed from magnetized ferrite material, the permeability of this element does not have a constant value but rather varies in accordance with variations in the wave polarization. This variable permeability is extremely useful in microwave application.

Ferrite materials of this type, when magnetized by a direct magnetic field, will absorb a large percentage of incident electromagnetic energy when this energy falls within a given narrow band of frequencies, the frequency range being determined by the intensity of the magnetic field. The frequency band is defined as the ferromagnetic resonance absorption band.

In conventional circuit applications, ferrite materials are used at frequencies which exceed the frequencies falling within the absorption band. Since the frequencies in the absorption band are uniquely specified by a given value of field intensity, in order for a ferrite element to be operated at frequencies above those in the absorption band, the field intensity must be reduced below this given value.

The field intensity, however, cannot be reduced indefinitely, because the permeabilities of conventional ferrites become erratic and unpredictable at relatively low microwave frequencies when the field intensity is reduced sufficiently to permit operation at these relatively low frequencies. More specifically, in conventional ferrites it is found that this erratic behavior can be expected when the frequencies to be used ($F_0$) are less than 2.8 times as large as the saturation magnetization of the ferrite ($H_0$) expressed in gausses in accordance with the known equation $$F_0 = 2.8 H_0$$

Since the saturation magnetizations of conventional ferrites are in excess of 1500 gausses, such ferrites cannot function effectively at frequencies appreciably below 5000 megacycles per second.

The microwave art has progressed to a point where ferrite materials could be used advantageously at frequencies appreciably below 5000 megacycles as for example in the frequency range of 2000–4000 megacycles. We have developed ferrite materials which can be used at these lower frequencies.

Accordingly it is an object of the present invention to improve ferrite materials in such manner as to permit advantageous use at frequencies appreciably below 5000 megacycles per second.

Another object is to provide new and improved ferrite materials which can be used advantageously at frequencies falling within the range of 2000–4000 megacycles per second and further to provide new and improved processes for making the same.

Still another object is to provide new and improved ferrite materials which will not absorb appreciable incident electromagnetic energy at frequencies below 5000 megacycles per second.

Yet another object of the invention is to provide new and improved ferrite materials characterized by low saturation magnetizations, low dielectric loss and good temperature stability at frequencies appreciably below 5000 megacycles per second.

Still another object is to provide new and improved ferrite materials characterized by a saturation magnetization falling within the approximate range of 500–1000 gausses.

These and other objects of our invention will either be explained or will become apparent hereinafter.

In accordance with our invention, the oxides of magnesium, iron, aluminum and manganese are reacted together in the solid state at high temperatures to produce a ferrite material having the characteristic spinel crystal structure containing magnesium aluminate and magnesium ferrite in solid solution. The atomic concentration of the metallic constituents of this material in atomic ratios is defined by the approximate formula (1) $\quad Mg + (2-x-y)Fe + (x)Al + (y)Mn$ wherein the quantity $(x+y)$ must always be less than 2. We have found that this type of material, depending upon its particular composition, can have a saturation magnetization falling within the range 500–1000 gausses. This reduction in saturation magnetization, as compared to the conventional values of 1500 gausses and higher, permits ferrite elements having the composition indicated to be operated successfully at frequencies appreciably below 5000 megacycles per second, as for example in the range 2000–4000 megacycles per second.

We have found that a series of materials of varying composition which yet have the same saturation magnetization can be produced, providing that this magnetization has a value falling within the approximate range of 500–1000 gausses. For any given series, the magnesium content is held constant, and the manganese, and aluminum content is varied in such manner that the combined iron, manganese and aluminum content in terms of their atomic ratios is always equal to approximately 2. The atomic ratios of these manganese and aluminum constituents must be increased or decreased simultaneously, as we have found that an increase in the aluminum content tends to decrease the saturation magnetization while an increase in the manganese content tends to increase the saturation magnetization.

For any given value of saturation magnetization, as the combined manganese and aluminum content is increased, the Curie temperature decreases, the dielectric loss tangent tends to decrease (the loss tangent is a measure of the conductivity of a ferrite material when used as a dielectric in a capacitor), and the ease of producing a dense hard ferrite material tends to increase.

In one method of preparing this type of material, aqueous solution of decomposable salts of magnesium, iron, aluminum and manganese (for example the nitrates of these metals) are mixed together; this mixture is first heated in order to expel the water and to melt the salts. At this point, the firing temperature is increased to a value sufficient to decompose the salts into oxides.

The oxides are then cooled, intimately mixed together and fired at a temperature sufficient to initiate the solid state reaction between the various oxides. In order to ensure a complete reaction between the materials, this last described operation, if necessary, can be repeated several times. At this point a ferrite powder has been produced. This powder is then pressure formed into a structure having a desired geometrical form, as for example a bar or toroid, and then is sintered to form a dense hard ferrite material suitable for end use as a circuit element.

Further details of our invention will be found with reference to the working examples which follow.

EXAMPLE I

An aqueous solution of nitrates containing 27.739% by weight of magnesium nitrate hexahydrate, 56.1% by weight of ferric nitrate monohydrate, 18.097% by weight of aluminum nitrate monohydrate and 1.036% by weight of manganous nitrate was heated in air to a temperature of 100° C. to permit the water to evaporate slowly without spattering.

When most of the water was evaporated, the temperature was raised to about 150° C. to expel the remaining water and melt the nitrates. The temperature was then raised to between 500°–600° C. to decompose the nitrates into oxides.

The oxide mix was then cooled and ball milled in alcohol. The slurry was then filtered and the comminuted oxide filter cake was dried. The dried cake was then fired in air at a temperature of about 950° C. to iniate the reaction between the oxides.

The reacted oxides were then cooled and again ball milled in alcohol to produce a fine powder slurry.

The slurry was filtered and the powder after being filtered from the slurry was dried and fired in air (calcined) at a temperature of about 1200° C. for a period of 2–6 hours. This calcining operation was repeated after a second ball milling operation to insure that all oxides had been completely reacted.

The fine powder was then mixed in an alcohol slurry with an organic binder such as methyl cellulose (in this example between 2%–8% by weight of methyl cellulose was used) and an organic lubricant, such as stearic acid (in this example between 2%–5% by weight stearic acid was used) in an alcohol slurry for a period of about 3 hours.

The slurry was then filtered repeatedly and the filter cake was dried and ground into a fine powder. The powder was then sieved through a 325 mesh screen.

The screened powder was then molded into a desired shape (in this example, a bar) in a polished bonded steel die at a pressure within the range 5000–25,000 pounds per square inch. The pressed shape was then placed on a non-reactive settling plate (formed for example of non-reactive alumina, zirconia or platinum metal) and fired in air at a temperature of about 5000° C. to volatize and drive off the binder and lubricant.

The resultant structure was then sintered in air at a temperature of about 1350°–1500° C. for a period of 6–10 hours.

A sleeve having the following composition $$MgFe_{1.44}Al_{0.5}Mn_{0.06}O_4^{\pm}$$

(the precise oxygen content depends upon the valence of manganese which has not been definitely established) was produced in this manner.

This sleeve was inserted within a section of coaxial line having an inner diameter of 0.125 inch and an outer diameter of 0.375 inch.

It was found that the sleeve had a saturation magnetization of 600 gausses. Further, when tested, this filled section was found to have an insertion loss of less than .15 db per inch over a frequency range of 2000–4000 megacycles per second.

The sleeve itself was found to have a direct current resistivity of $6 \times 10^{-8}$ ohm centimeters. The Curie temperature was found to be 170° C. The dielectric loss tangent was found to be less than 0.01 to 2000 megacycles per second. The density was found to be 3.50 grams per cubic centimeter.

EXAMPLE II

The process described in Example I was repeated using the compositions tabulated in Table I below. All these compositions were found to have a saturation magnetization of approximately 600 gausses. As indicated previously, it was found that the Curie temperature decreased and the dielectric loss tangent tended to decrease with an increase in the combined aluminum and manganese content, while the ease of producing a dense hard ferrite material tended to increase with this increase in the combined aluminum and manganese content.

Table I
METALLIC CONSTITUENTS IN ATOMIC RATIOS

| Magnesium | Iron | Aluminum | Manganese |
|---|---|---|---|
| 1 | 1.55 | .45 | 0 |
| 1 | 1.37 | .53 | 0.1 |
| 1 | 1.31 | .54 | 0.15 |
| 1 | 1.22 | .56 | 0.22 |

EXAMPLE III

The process described in Example I was repeated using the compositions tabulated in Table II below. All of these compositions behaved in analogous manner to the compositions described in Example II.

Table II

| Magnesium | Iron | Aluminum | Manganese | Saturation/ Magnetization |
|---|---|---|---|---|
| 1 | 1.49 | .51 | 0 | 500 |
| 1 | 1.40 | .54 | .06 | 500 |
| 1 | 1.33 | .56 | .11 | 500 |
| 1 | 1.22 | .58 | .20 | 500 |
| 1 | 1.54 | .46 | 0 | 600 |
| 1 | 1.42 | .5 | .08 | 600 |
| 1 | 1.32 | .52 | .16 | 600 |
| 1 | 1.25 | .53 | .22 | 600 |
| 1 | 1.60 | .40 | 0 | 700 |
| 1 | 1.44 | .46 | .10 | 700 |
| 1 | 1.36 | .48 | .16 | 700 |
| 1 | 1.27 | .49 | .24 | 700 |
| 1 | 1.68 | .31 | .01 | 900 |
| 1 | 1.52 | .40 | .08 | 900 |
| 1 | 1.57 | .42 | .01 | 900 |
| 1 | 1.45 | .43 | .12 | 900 |

Further tests indicated that the saturation magnetization could be increased somewhat above 900 gausses, the upper limit being approximately 1000 gausses.

As indicated in Example I, the firing temperature can be varied within the range 1350–1500° C. For any given series of materials, the firing temperature and rate of cooling should be held constant, otherwise it will be found that the saturation magnetization and Curie temperature will differ from the values desired.

While we have shown and pointed out our invention as applied above, it will be apparent to those skilled in the art that many modifications can be made within the scope and sphere of our invention as defined in the claims which follow.

What is claimed is:

1. A ferrite material adapted for use at microwave frequencies appreciably below 5000 megacycles per second, said material having a spinel crystal structure and containing magnesium aluminate and magnesium ferrite in solid solution together with manganese as a metallic constitutent, the metallic constituent composition of said material being defined by the approximate formula (1)  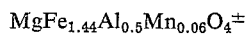

wherein these constituents are expressed in atomic ratios wherein $x$ is in the range .31 to .58, $y$ is in the range 0 to .24, the quantity $(x+y)$ is always less than 2, and wherein the ratio of Fe to the sum of Fe and Al lies between .68 and .84, the dielectric loss tangent and the Curie temperature of said material decreasing as the quantity $(x+y)$ increases.

2. A ferrite material having a saturation magnetization of about 600 gausses, a Curie temperature of about 170° C. and a dielectric loss tangent of about .01 at a frequency of 2000 megacycles, said material having the following approximate compositon: $MgFe_{1.44}Al_{0.5}Mn_{0.06}O_4$.

(References on following page)

References Cited in the file of this patent

UNITED STATES PATENTS

| | | |
|---|---|---|
| 1,997,193 | Kato et al. | Apr. 9, 1935 |
| 2,565,861 | Leverenz et al. | Aug. 28, 1951 |
| 2,579,267 | Leverenz et al. | Dec. 18, 1951 |
| 2,715,109 | Albers-Schoenberg | Aug. 9, 1955 |
| 2,981,903 | Van Uitert | Apr. 25, 1961 |

FOREIGN PATENTS

| | | |
|---|---|---|
| 130,815 | Australia | Jan. 10, 1949 |
| 1,074,864 | France | Apr. 7, 1954 |

OTHER REFERENCES

Gorter: Proceedings of the IRE, December 1955, pp. 1952–1955, 1960.

"Ferromagnetism," Bozorth, D. Van Nostrand Co., N.Y., 1951, p. 246.

Physica III, No. 6, June 1936, pp. 463–483, page 481 pertinent.

R.C.A. Review, September 1950, pages 344–346.

Proc. Phys. Soc. (London), B65–1952, pp. 390–391.

Physical Review, vol. 92, No. 5, Dec. 1, 1953, page 1120.